(12) United States Patent
Fang et al.

(10) Patent No.: US 8,352,252 B2
(45) Date of Patent: Jan. 8, 2013

(54) SYSTEMS AND METHODS FOR PREVENTING THE LOSS OF INFORMATION WITHIN A SPEECH FRAME

(75) Inventors: Zheng Fang, San Diego, CA (US); Daniel J. Sinder, San Diego, CA (US); Ananthapadmanabhan A. Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 885 days.

(21) Appl. No.: 12/478,492

(22) Filed: Jun. 4, 2009

(65) Prior Publication Data
US 2010/0312552 A1 Dec. 9, 2010

(51) Int. Cl.
*G10L 19/00* (2006.01)
(52) U.S. Cl. ........................................ 704/219
(58) Field of Classification Search .................. 704/219
See application file for complete search history.

(56) References Cited

U.S. PATENT DOCUMENTS

| | | | |
|---|---|---|---|
| 6,141,353 A | 10/2000 | Li | |
| 6,611,804 B1 | 8/2003 | Dorbecker et al. | |
| 6,985,856 B2 * | 1/2006 | Wang et al. | 704/226 |
| 7,155,538 B1 * | 12/2006 | Rossello et al. | 709/249 |

FOREIGN PATENT DOCUMENTS
EP 0984570 3/2000

OTHER PUBLICATIONS

International Search Report and Written Opinion—PCT/US2010/037310, International Search Authority—European Patent Office—Aug. 17, 2010.

\* cited by examiner

*Primary Examiner* — Susan McFadden
(74) *Attorney, Agent, or Firm* — Heejong Yoo

(57) ABSTRACT

A method for preventing the loss of information within a speech frame is described. A first speech frame to be encoded is selected. A determination is made as to whether or not a second speech frame is a critical speech frame based on the information within the second speech frame and one or more adjacent speech frames. At least a part of an encoded version of the second speech frame is created according to a selected forward error correction (FEC) mode if the second speech frame is a critical speech frame. The first speech frame and the at least a part of the encoded version of the second speech frame are transmitted.

55 Claims, 10 Drawing Sheets

//<br>

SYSTEMS AND METHODS FOR PREVENTING THE LOSS OF INFORMATION WITHIN A SPEECH FRAME

TECHNICAL FIELD

The present systems and methods relate to communication and wireless-related technologies. In particular, the present systems and methods relate to systems and methods for preventing the loss of information within a speech frame.

BACKGROUND

Digital voice communications have been performed over circuit-switched networks. A circuit-switched network is a network in which a physical path is established between two terminals for the duration of a call. In circuit-switched applications, a transmitting terminal sends a sequence of packets containing voice information over the physical path to the receiving terminal. The receiving terminal uses the voice information contained in the packets to synthesize speech.

Digital voice communications have started to be performed over packet-switched networks. A packet-switch network is a network in which the packets are routed through the network based on a destination address. With packet-switched communications, routers determine a path for each packet individually, sending it down any available path to reach its destination. As a result, the packets do not arrive at the receiving terminal at the same time or in the same order. A de-jitter buffer may be used in the receiving terminal to put the packets back in order and play them out in a continuous sequential fashion.

On some occasions, a packet is lost in transit from the transmitting terminal to the receiving terminal. A lost packet may degrade the quality of the synthesized speech. As such, benefits may be realized by providing systems and method for preventing the loss of information within a speech frame.

DETAILED DESCRIPTION

Figure 1:
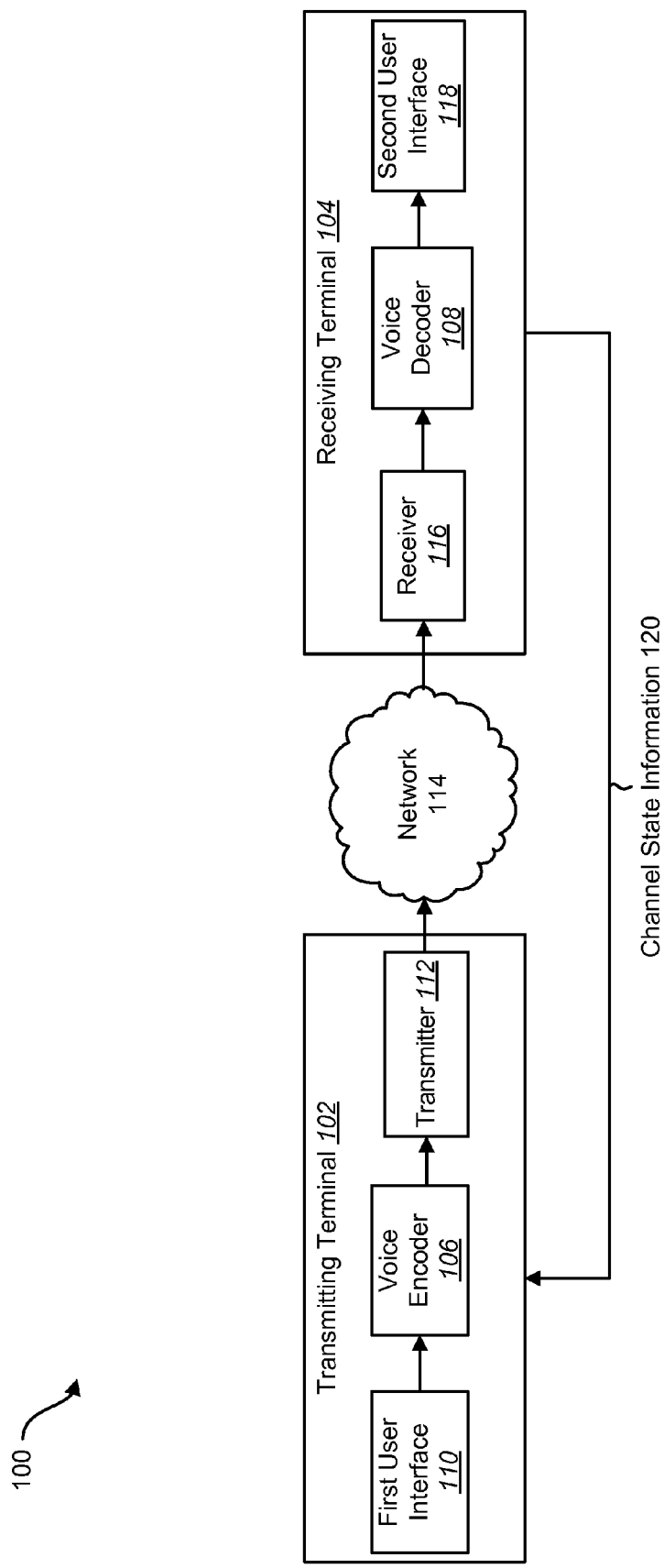
FIG. 1 is a block diagram illustrating an example of a transmitting terminal and a receiving terminal over a transmission medium.

Voice applications may be implemented in a packet-switched network. For example, voice applications may be implemented in a Voice over Internet Protocol (VoIP) network. Packets with voice information may be transmitted from a first device to a second device on the network. However, some of the packets may be lost during the transmission of the packets. For example, the loss of multiple packets (sometimes referred to as bursty packet loss) may be a reason for the degradation of perceived speech quality at a receiving device. In one configuration, a packet may include one or more frames.

In order to alleviate the degradation of the perceived speech quality caused by packet losses in a VoIP network, there exist two types of solutions. The first solution may be a receiver-based packet loss concealment (PLC) method. PLC methods may be a technique to mask the effects of packet loss in VoIP communications. For example, PLC methods may be implemented to create a substitute packet instead of the one that was lost during transmission. The PLC method may attempt to create a packet as similar as possible to the one that was lost. Receiver-based PLC methods may not need any additional resources or help from the sender in order to create the substitute packet. However, PLC methods may not effectively mask the effects of packet loss when important speech frames are lost.

The second solution may be a sender-based packet loss resilient scheme. An example of such a scheme may be a forward error correction (FEC) method. The FEC method may include sending some additional data with each packet. The additional data may be used to restore errors caused by the loss of data during the transmission. For example, FEC schemes may transmit redundant speech frames. In other words, more than one copy (typically two) of a speech frame is transmitted by the sender. These two frames may be referred to as a primary copy and a redundant copy.

Although sender-based packet loss resilient schemes may improve the perceptual quality of the decoded speech, these schemes may also increase the bandwidth used during transmission of the speech. Traditional FEC schemes may also increase the end-to-end delay, which may be intolerable for real-time conversations. For example, conventional sender-based schemes send the same speech frame twice at two different time periods. This may at least double the data rate. Some conventional schemes may use a low-bit rate codec for the redundant copy in order to reduce the data rate. However, the use of a low-bit rate codec may increase the complexity at the encoder. In addition, some conventional schemes may use the same low-bit rate codec for both the primary copy of the frame and the redundant copy of the frame. Although this may reduce the complexity at the encoder as well as reduce the data rate, the baseline speech quality (i.e., the speech quality when no frames are lost) is greatly reduced. Further, conventional sender-based schemes operate under the assumption of an additional delay of at least one frame interval.

The present systems and methods provide a source and channel controlled FEC scheme in order to obtain the optimal trade-off between speech quality, delay and data rate. In one configuration, no additional delay is introduced in this FEC scheme. High quality improvement of the speech quality under moderate data rate increases may be achieved. The FEC scheme described below may also operate at any target data rate. In one example, the FEC scheme and a target data rate may be adaptively adjusted based on the condition of a transmission channel as well as external controls. The proposed FEC scheme may also be compatible with legacy communication devices (e.g., legacy handsets).

A method for preventing the loss of information within a speech signal is disclosed. The method may include selecting a first speech frame to be encoded. The method may also include determining if a second speech frame is a critical speech frame based on the information within the second speech frame and one or more adjacent speech frames. The method may also include creating an at least a part of an encoded version of the second speech frame if the second speech frame is a critical speech frame. The method may also include transmitting the first speech frame and at least a part of the encoded version of the second speech frame.

A wireless device for preventing the loss of information within a speech signal is disclosed. The wireless device may include a critical frame identification module configured to use the information within a second speech frame and one or more adjacent speech frames to determine if the second speech frame is a critical speech frame. The wireless device may also include a forward error correction (FEC) module configured to create at least a part of an encoded version of the second speech frame according to a selected forward error correction mode if the second speech frame is a critical speech frame. The wireless device may also include a transmitter configured to transmit the first speech frame and at least a part of the encoded version of the second speech frame.

An apparatus for preventing the loss of information within a speech signal is disclosed. The apparatus may include means for selecting a first speech frame to be encoded. The apparatus may also include means for determining if a second speech frame is a critical speech frame based on the information within the second speech frame and one or more adjacent speech frames. The apparatus may also include means for creating at least a part of an encoded version of the second speech frame according to a selected forward error correction mode if the second speech frame is a critical speech frame. The apparatus may further include means for transmitting the first speech frame and at least a part of the encoded version of the second speech frame.

A computer-program product for preventing the loss of information within a speech signal is disclosed. The computer-program product may include a computer readable medium having instructions thereon. The instructions may include code for selecting a first speech frame to be encoded. The instructions may also include code for determining if a second speech frame is a critical speech frame based on the information within the second speech frame and one or more adjacent speech frames. The instructions may further include code for creating at least a part of an encoded version of the second speech frame according to a selected forward error correction mode if the second speech frame is a critical speech frame. The instructions may also include code for transmitting the first speech frame and at least a part of the encoded version of the second speech frame.

FIG. 1 is a block diagram 100 illustrating an example of a transmitting terminal 102 and a receiving terminal 104 over a transmission medium 114. The transmitting and receiving terminals 102, 104 may be any devices that are capable of supporting voice communications including phones, computers, audio broadcast and receiving equipment, video conferencing equipment, or the like. In one configuration, the transmitting and receiving terminals 102, 104 may be implemented with wireless multiple access technology, such as Code Division Multiple Access (CDMA) capability. CDMA is a modulation and multiple access scheme based on spread-spectrum communications.

The transmitting terminal 102 may include a voice encoder 106 and the receiving terminal 104 may include a voice decoder 108. The voice encoder 106 may be used to compress speech from a first user interface 110 by extracting parameters based on a model of human speech generation. A transmitter 112 may be used to transmit packets including these parameters across the transmission medium 114. The transmission medium 114 may be a packet-based network, such as the Internet or a corporate intranet, or any other transmission medium. A receiver 116 at the other end of the transmission medium 114 may be used to receive the packets. The voice decoder 108 may synthesize the speech using the parameters in the packets. The synthesized speech may be provided to a second user interface 118 on the receiving terminal 104. Although not shown, various signal processing functions may be performed in both the transmitter and receiver 112, 116 such as convolutional encoding including cyclic redundancy check (CRC) functions, interleaving, digital modulation, spread spectrum processing, etc.

Each party to a communication may transmit as well as receive. Each terminal may include a voice encoder and decoder. The voice encoder and decoder may be separate devices or integrated into a single device known as a "vocoder." In the detailed description to follow, the terminals 102, 104 will be described with a voice encoder 106 at one end of the transmission medium 114 and a voice decoder 108 at the other.

In at least one configuration of the transmitting terminal 102, speech may be input from the first user interface 110 to the voice encoder 106 in frames, with each frame further partitioned into sub-frames. These arbitrary frame boundaries may be used where some block processing is performed. However, the speech samples may not be partitioned into frames (and sub-frames) if continuous processing rather than block processing is implemented. In the described examples, each packet transmitted across the transmission medium 114 may include one or more frames depending on the specific application and the overall design constraints.

The voice encoder 106 may be a variable rate or fixed rate encoder. A variable rate encoder may dynamically switch between multiple encoder modes from frame to frame, depending on the speech content. The voice decoder 108 may also dynamically switch between corresponding decoder modes from frame to frame. A particular mode may be chosen for each frame to achieve the lowest bit rate available while maintaining acceptable signal reproduction at the receiving terminal 104.

In one configuration, the receiver terminal 104 may also feedback channel state information 120 to the transmitting terminal 102. In one example, the receiving terminal 104 collects information relating to the quality of the channel used to transmit packets from the transmitting terminal 102. The receiving terminal 104 may use the collected information to estimate the quality of the channel. This estimate may then be fed back to the transmitting terminal 102 as channel state information 120. The transmitting terminal 102 may use the channel state information 120 to adapt one or more functions associated with the sender-based packet loss resilient scheme (i.e., the FEC scheme). Details regarding the adaptation of the FEC scheme based on the received channel state information 120 will be more fully described below.

The voice encoder 106 and decoder 108 may use Linear Predictive Coding (LPC). With LPC encoding, speech may be modeled by a speech source (the vocal chords), which is characterized by its intensity and pitch. The speech from the vocal cords travels through the vocal tract (the throat and mouth), which is characterized by its resonances, which are called "formants." The LPC voice encoder may analyze the speech by estimating the formants, removing their effects from the speech, and estimating the intensity and pitch of the residual speech. The LPC voice decoder at the receiving end may synthesize the speech by reversing the process. In particular, the LPC voice decoder may use the residual speech to create the speech source, use the formants to create a filter (which represents the vocal tract), and run the speech source through the filter to synthesize the speech.

Figure 2:
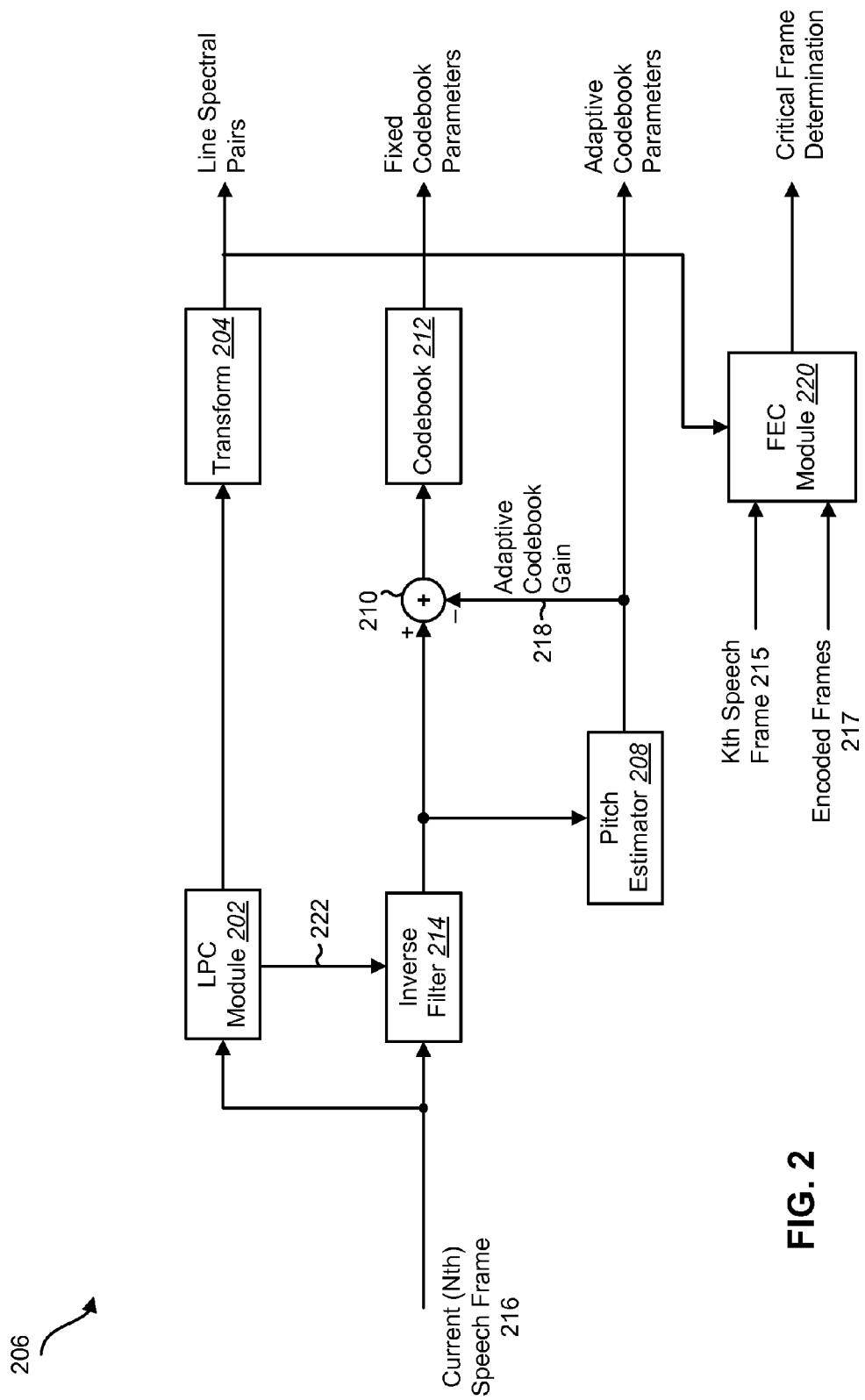
FIG. 2 is a block diagram illustrating a further configuration of the transmitting terminal.

FIG. 2 is a block diagram illustrating an example of an LPC voice encoder 206. The LPC voice encoder 206 may include an LPC module 202, which estimates the formants from the speech in a current or Nth speech frame 216. The basic solution may be a difference equation, which expresses each speech sample in a frame as a linear combination of previous speech samples (short term relation of speech samples). Coefficients of the difference equation characterize the formants. The LPC coefficients 222 may be applied to an inverse filter 214, which may remove the effects of the formants from the speech. The residual speech, along with the LPC coefficients, may be transmitted over the transmission medium so that the speech can be reconstructed at the receiving end. In at least one configuration of the LPC voice encoder 206, the LPC coefficients are transformed into line spectral pairs (LSP) by a transform module 204. The coefficients may be transformed for better transmission and mathematical manipulation efficiency.

Further compression techniques may be used to dramatically decrease the information required to represent speech by eliminating redundant material. This may be achieved by exploiting the fact that there are certain fundamental frequencies caused by periodic vibration of the human vocal chords. These fundamental frequencies are often referred to as the "pitch." The pitch can be quantified by "adaptive codebook parameters" which include (1) the "delay" in the number of speech samples that maximizes the autocorrelation function of the speech segment, and (2) the "adaptive codebook gain" 218. The adaptive codebook gain may measure 218 how strong the long-term periodicities of the speech are on a sub-frame basis. These long term periodicities may be subtracted 210 from the residual speech before transmission to the receiving terminal.

The residual speech from the subtractor 210 may be further encoded in any number of ways. For example a codebook 212 may be used, which is a table that assigns parameters to the most typical speech residual signals. In operation, the residual speech from the subtractor 210 is compared to all entries in the codebook 212. The parameters for the entry with the closest match are selected. The fixed codebook parameters include the "fixed codebook indices" and the "fixed codebook gain." The fixed codebook coefficients contain the new information (energy) for a frame. It basically is an encoded representation of the differences between frames. The fixed codebook gain represents the gain that the voice decoder 108 in the receiving terminal 104 should use for applying the new information (fixed codebook coefficients) to the current sub-frame of speech.

A pitch estimator 208 may also be used to generate an additional adaptive codebook parameter called "Delta Delay" or "DDelay." The DDelay is the difference in the measured delay between the current and previous frame. It has a limited range however, and may be set to zero if the difference in delay between the two frames overflows. This parameter may not be used by the voice decoder 108 in the receiving terminal 104 to synthesize speech. Instead, it is used to compute the pitch of speech samples for lost or corrupted frames.

In one configuration, the encoder 206 may also include an FEC module 220. The FEC module 220 may receive the Kth speech frame 215, where K is less than or equal to N. The FEC module 220 may also receive one or more encoded frames 217 that occur before the Kth speech frame 215 and/or one or more encoded frames 217 that occur after the Kth speech frame 215, if these encoded frames 217 exist when the FEC module 220 analyzes the Kth speech frame 215.

The FEC module 220 may analyze the Kth speech frame 215. The FEC module 220 may determine whether the Kth speech frame 215 is a critical frame. The analyzed Kth speech frame 215 may be considered a critical frame based on information that is included in the Kth speech frame 215 and the one or more encoded frames 217 occurring before and/or after the Kth speech frame 215 that are received by the FEC module 220. The FEC module 220 may also determine the processes to implement that will "protect" the Kth speech frame 215, if it is determined that the Kth speech frame 215 is a critical frame.

Processes to protect a critical frame may include creating a redundant copy of the critical frame. The redundant copy of the critical frame may include some or all of the parameters of the critical frame. The FEC module 220 may determine to protect the Kth speech frame 215 in the event that the Kth speech frame 215 is a critical frame and may be lost during transmission to the receiving terminal 104. More details regarding the FEC module 220 are described below.

Figure 3:
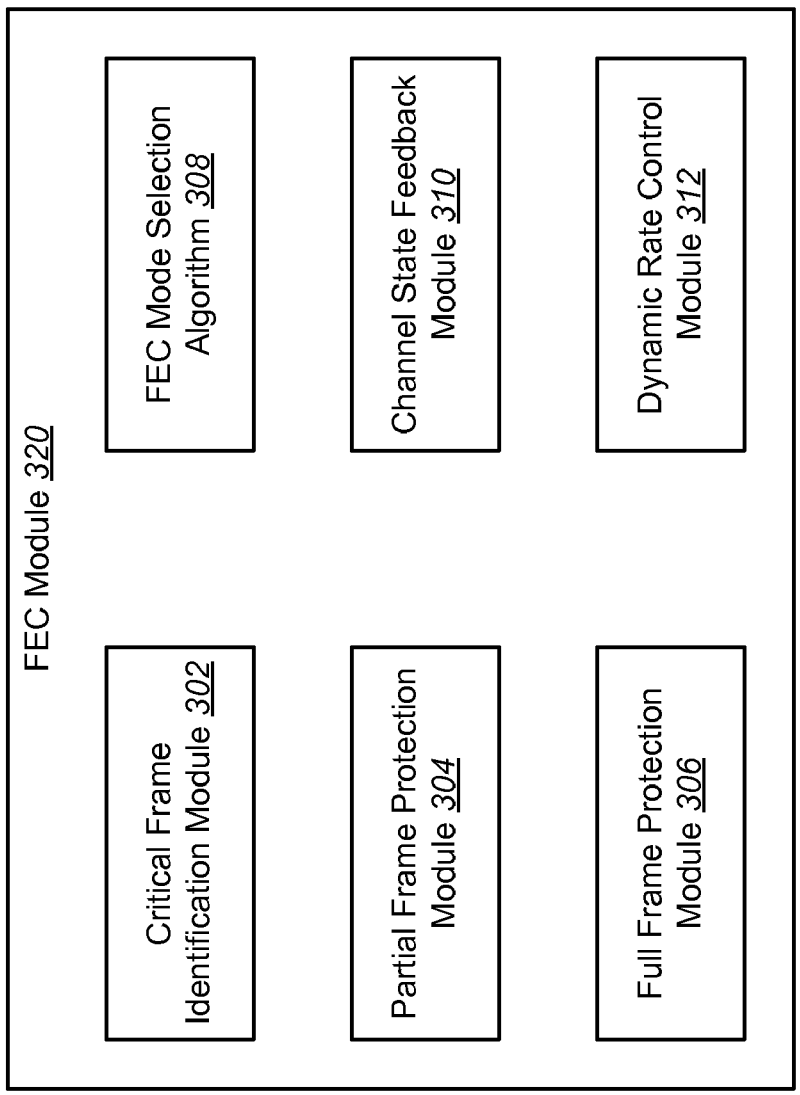
FIG. 3 is a block diagram illustrating one configuration of a forward error correction (FEC) module.

FIG. 3 is a block diagram illustrating one configuration of an FEC module 320. The FEC module 320 may include one or more additional modules that are used to analyze a speech frame, determine whether the speech frame is a critical frame and protect the speech frame by creating a redundant copy of the speech frame. The frame to be copied may be referred to herein as the primary frame. The redundant copy may be produced by duplicating some or all of the parameters of the primary frame, or may be produced by encoding the primary frame using a coding method different from the one used to encode the primary frame. Usually this coding method has a lower-rate than the primary frame.

Figure 7:
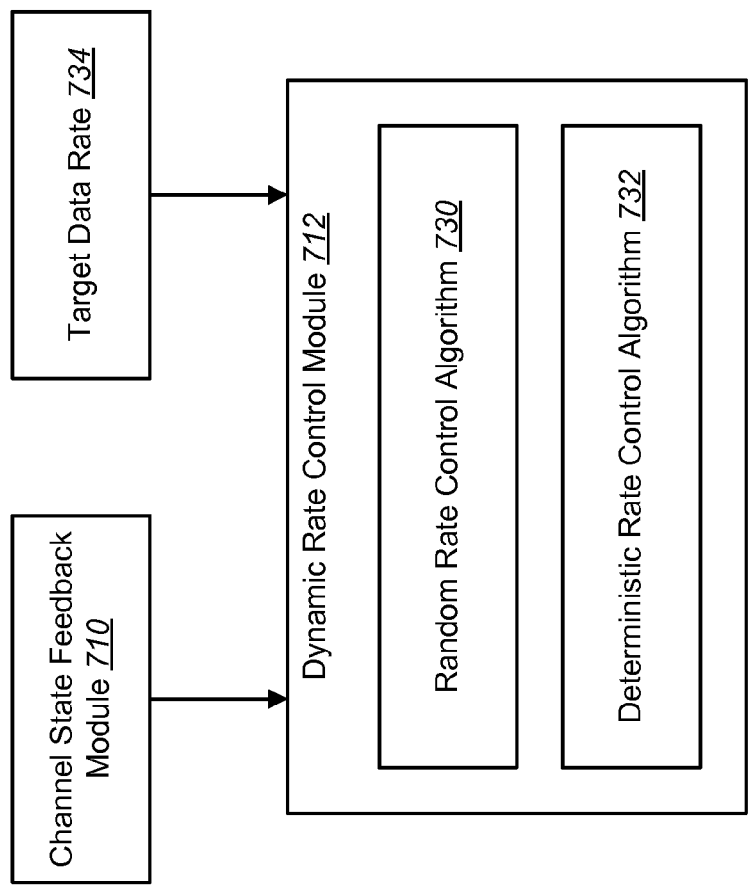
FIG. 7 is a block diagram illustrating one example of a dynamic rate control module.

In one example, the FEC module 320 includes a critical frame identification (ID) module 302 (discussed in relation to FIG. 4), a partial frame protection module 304 (discussed in relation to FIG. 5), a full frame protection module 306 (discussed in relation to FIG. 5), an FEC mode selection algorithm 308 (discussed in relation to FIG. 5), a channel state feedback module 310 (discussed in relation to FIG. 6) and a dynamic rate control module 312 (discussed in relation to FIG. 7). The critical frame ID module 302 may determine whether or not a speech frame is a critical frame. In one configuration, this module 302 may be used to identify the most important frames under packet loss conditions.

Figure 4:
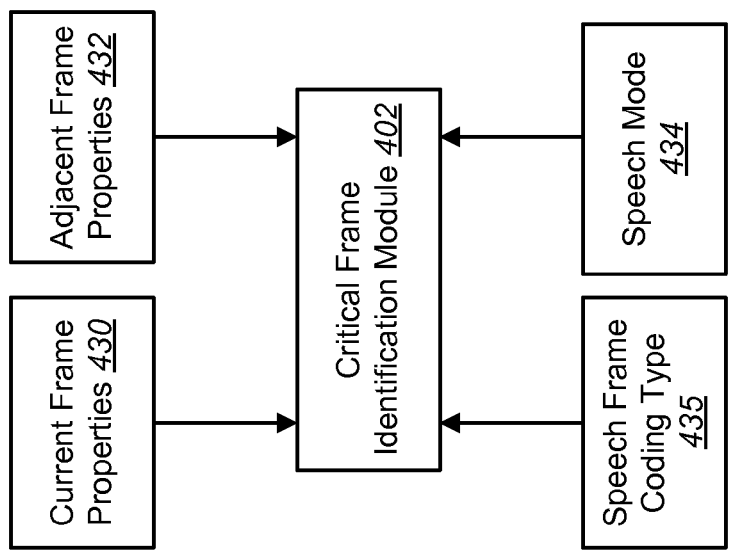
FIG. 4 is a block diagram illustrating one configuration of a critical frame identification module.

FIG. 4 is a block diagram illustrating one configuration of a critical frame identification module 402. The module 402 may determine whether a frame is a critical frame by analyzing properties 430 of the frame as well as adjacent frame properties 432. The critical frame may be a frame that, when lost, may cause a significant quality degradation. For example, if some important parameters change greatly (larger than some predetermined threshold) from the previous frame to the current frame, the current frame may be a critical frame since the current frame may not easily be predicted from the previous frame. In addition, the critical frame ID module 402 may determine if a speech frame is a critical frame based on a speech mode 434 of the frame and the adjacent frames. The critical frame determination may also be based on the coding type 435 of the frame and the adjacent frames. For example, the speech mode 434 may indicate the characteristics of every frame. The speech frame coding type may indicate the encoding process used to encode the current frame. Examples of speech frame coding types may include code excited linear prediction (CELP), noise excited linear prediction (NELP), prototype pitch period (PPP), etc. Examples of speech mode may include voiced, unvoiced, silence, transient, voiced onset, etc. For example, a critical CELP frame may be more critical than a critical NELP frame, while a voice on-set frame may be more critical than a steady-voiced frame. In one configuration, the critical frame identification module 402 may not require any additional encoding delay to determine whether or not a speech frame is a critical frame.

The critical frame identification module may not only determine whether a frame is a critical frame, but may also determine the criticalness level of a frame. This may be based upon the parameters, characteristics, coding types, and modes of a speech frame and its adjacent frames. Different critical frames may have different level of criticalness. For example, for two critical frames, A and B, if the frame next to A is highly predictable from A and the frame next to B doesn't quite depend on B, then A may be more critical than B, because losing A may cause quality degradation over more than one frame.

Returning to FIG. 3, the FEC module 320 may also include an FEC mode selection algorithm 308. The selection algorithm 308 may select a protection mode to implement when a frame is determined to be a critical frame. The protection mode may indicate the quantity of parameters of a critical frame that are to be copied into a redundant copy of the critical frame. Examples of protection modes may include a full protection mode and one or more partial protection modes. For example, a partial protection mode may protect only one set of parameters or multiple sets of parameters.

In one example, the full protection mode may be implemented by a full frame protection module 306. The full protection mode may indicate that every parameter in a critical frame is copied and included in a redundant copy of the frame. In one configuration, a partial protection mode may be implemented by a partial frame protection module 304. The partial protection mode may indicate that only a part of the parameters of a critical frame are copied and included in the redundant copy of the critical frame. The partial protection mode may also indicate the frame is encoding by a low-rate encoding method.

Figure 5:
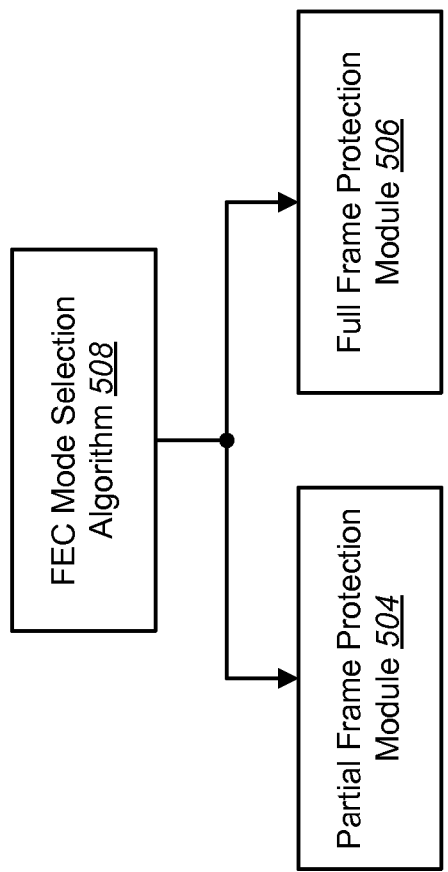
FIG. 5 is a block diagram illustrating one example of an FEC mode selection algorithm.

As illustrated in FIG. 5, an FEC mode selection algorithm 508 may select either a partial frame protection module 504 or a full frame protection module 506 to implement the selected protection mode. The full protection mode and the partial protection modes may utilize the available bandwidth effectively and provide backward compatibility with legacy communication devices. In one configuration, the partial protection modes may be disabled when the full protection mode is selected. The FEC mode selection algorithm 508 may select which protection mode to implement based on the physical properties of the transmission channel used to transmit packets from the transmitting terminal 102 to the receiving terminal 104. The selection of which mode to use may also be based on the characteristics of a frame. If only a subset of parameters change greatly between the previous frame and the current frame, only this subset of parameters need to be protected. In this case, the other parameters which are not protected may be predicted from the previous frame if a frame loss happens. In addition, the FEC mode selection algorithm 508 may select the protection mode based on the protection modes that are supported by the transmitting terminal 102.

Figure 6:
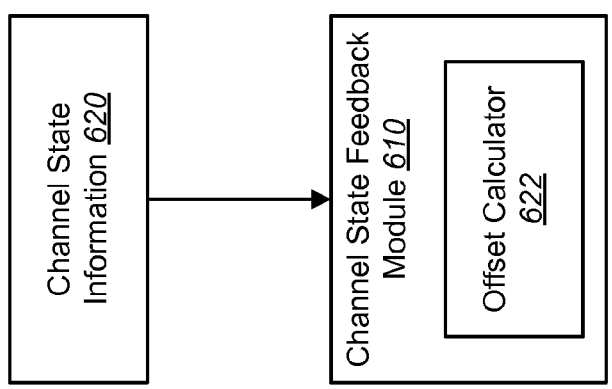
FIG. 6 is a block diagram illustrating one configuration of a channel state feedback module.

Returning to FIG. 3, the FEC module 320 may also include a channel state feedback module 310. As shown in FIG. 6, a channel state feedback module 610 may receive channel state information 620. The channel state information 620 may be collected and estimated at the receiving terminal 104, as previously described. The channel state information 620 may be transmitted back to the transmitting terminal 102. In one configuration, the channel state feedback module 620 analyzes the received channel state information 620. The information 620 may indicate the quality of the channel used for transmissions between the transmitting terminal 102 and the receiving terminal 104. The feedback module 610 may analyze the quality of the channel and provide the results to the FEC mode selection algorithm 308.

Based upon the quality of the channel (provided by the channel state feedback module 610), the selection algorithm 308 may adaptively change the selected protection mode. In other words, as the quality of the channel deteriorates, the FEC mode selection algorithm 308 may select the partial protection mode in order to reduce the data rate needed to send the redundant copy of the critical frame to the receiving terminal 104. As the quality of the channel increases, the FEC mode selection algorithm 308 may adapt and select the full protection mode. With the full protection mode, each parameter of the critical frame is copied and included in the redundant copy of the frame. An increase in the channel quality may indicate that a higher data rate may be achieved.

In one configuration, the channel state feedback module 610 may also include an offset calculator 622. In one example, the offset calculator 622 determines the value of an FEC offset. The offset may be the interval between the transmit time of the primary copy of a frame and the transmit time of the redundant copy of the frame. In other words, the offset calculator 622 may determine when the redundant copy of a critical frame is transmitted to a receiving terminal 104. Usually the packet losses in a packet-switched network are bursty and the bursty lengths may be different under different network conditions. Thus, using a dynamically-adjusted offset may result in better error-protection performance. The optimal offset may be estimated using the channel state information sent by the receiver.

Returning to FIG. 3, the FEC module 320 may further include a dynamic rate control module 312. The rate control module 312 may decide the final protection mode for each frame in order to meet a target data rate. As illustrated in FIG. 7, the dynamic rate control module 712 may decide the final protection mode based on channel state information 120 received from the channel state feedback module 710 and a specified target data rate 734.

In order to determine the final protection mode, the rate control module 712 may implement two steps to approach a predetermined target rate. In the first step, two adjacent operating points may be determined. Operating points may be data rates. These two adjacent operating points may be chosen so that the value of the target data rate 734 is between the values of the two operating points. In one configuration, an operating point may be a predefined protection decision that is based on speech frame error-resilience properties. If a first operating point has a higher data rate than a second operating point, the performance of the protection decision associated with the first operating point may be better under packet loss conditions than the protection decision associated with the second operating point.

In the second step, within the range of the protection decision defined by the two adjacent operating points in the first step, the dynamic rate control module 712 may adaptively adjust the protection decision to meet the target data rate 734. In one configuration, two dynamic control algorithms may be provided, for example, a random rate control algorithm 730 and a deterministic rate control algorithm 732. The random rate control algorithm 730 may use a random algorithm to decide the protection decision of each frame. The random algorithm may be configured so that the average data rate approaches target data rate 734. Alternatively, the deterministic rate control algorithm may decide the protection decision of each frame through a deterministic way. The average rate may be calculated for every frame. If the average rate is more than the target rate, a lower data rate protection or non-protection may be used for the current frame; otherwise, a higher data rate protection may be used for the current frame. The protection decision of the current frame may also be bounded by the range of the protection decision defined by the two adjacent operating points in the first step. The target data rate 734 may be specified externally based on the capacity demands. Alternatively, the target data rate 734 may be specified internally based on the feedback of the channel state information 120.

Figure 8:
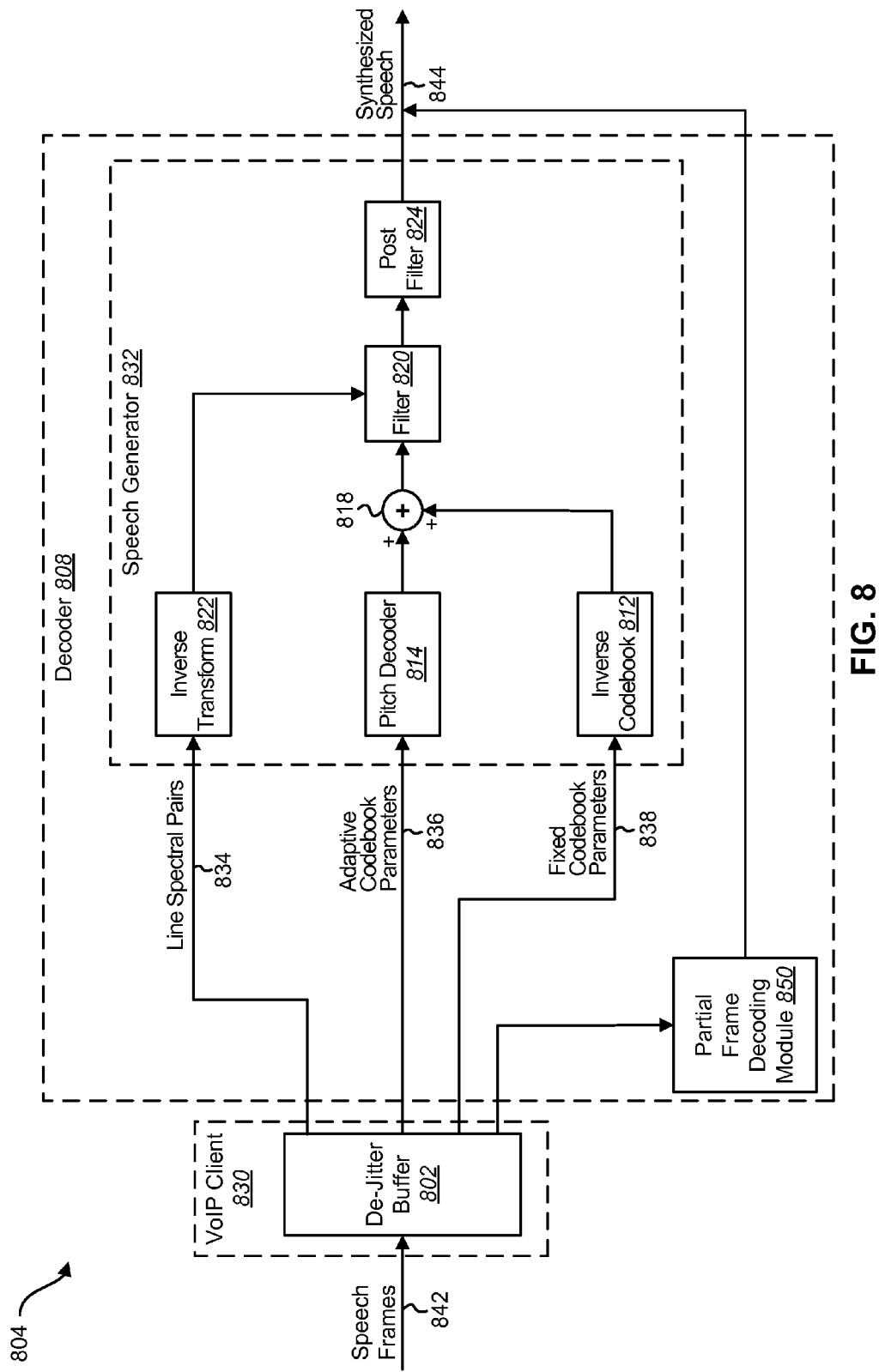
FIG. 8 is a block diagram illustrating one configuration of the receiving terminal.

FIG. 8 is a block diagram of a receiving terminal 804. In this configuration, a VoIP client 830 includes a de-jitter buffer 802. The receiving terminal 804 may also include a voice decoder 808. The decoder 808 may include a speech generator 832. The voice decoder 808 may be implemented as part of a vocoder, as a stand-alone entity, or distributed across one or more entities within the receiving terminal 804. The voice decoder 808 may be implemented as hardware, firmware, software, or any combination thereof. By way of example, the voice decoder 808 may be implemented with a microprocessor, digital signal processor (DSP), programmable logic, dedicated hardware or any other hardware and/or software based processing entity. The voice decoder 808 will be described below in terms of its functionality. The manner in which it is implemented may depend on the particular application and the design constraints imposed on the overall system.

The de-jitter buffer 802 may be a hardware device or software process that eliminates jitter caused by variations in packet arrival time due to network congestion, timing drift, and route changes. The de-jitter buffer 802 may receive speech frames 842 in voice packets. In addition, the de-jitter buffer 802 may delay newly-arriving packets so that the previously-arrived packets can be continuously provided to the speech generator 832, in the correct order, resulting in a clear connection with little audio distortion. The de-jitter buffer 802 may be fixed or adaptive. A fixed de-jitter buffer may introduce a fixed delay to the packets. An adaptive de-jitter buffer, on the other hand, may adapt to changes in the network's delay. The de-jitter buffer 802 may provide speech frames to the decoder 808.

If a primary copy of a frame is not received by the de-jitter buffer, a frame loss may be caused if the FEC is not used. When FEC is used and the primary copy of the current to-be-played frame is lost, the de-jitter buffer may check whether there is a redundant copy of the frame in the buffer. If there is a redundant copy for the current frame, the redundant copy may be decoded to generate speech samples. The redundant copy may be a full frame or a partial frame.

In addition, the de-jitter buffer 802 may be modified to process a primary frame (i.e., the original critical frame) and a redundant frame (i.e., a copy of some or all of the original critical frame) differently. The buffer 802 may process these two frames differently so that the average delay associated with implementing the functions of the FEC module 220 is no larger than the average delay when the functions of the FEC module 220 are not implemented. Redundant copies of frames that include some (i.e., partial) of the parameters of the primary copy may be passed from the de-jitter buffer 802 to a partial frame decoding module 850.

As previously mentioned, various signal processing functions may be performed by the transmitting terminal 102 such as convolutional encoding including cyclic redundancy check (CRC) functions, interleaving, digital modulation, and spread spectrum processing.

The speech frames 842, released from the de-jitter buffer 802, may be provided to the speech generator 832 to generate synthesized speech 844. The speech generator 832 may include several functions in order to generate the synthesized speech 844. Any method of decoding speech into synthesized speech known in the art may be used. In the embodiment shown, the speech generator may use a CELP decoding method where an inverse codebook 812 may use fixed codebook parameters 838. For example, the inverse codebook 812 may be used to convert fixed codebook coefficients, to residual speech and apply a fixed codebook gain to that residual speech. Pitch information may be added 818 back into the residual speech. The pitch information may be computed by a pitch decoder 814 from the "delay." The pitch decoder 814 may be a memory of the information that produced the previous frame of speech samples. Adaptive codebook parameters 836, such as adaptive codebook gain, may be applied to the memory information in each sub-frame by the pitch decoder 814 before being added 818 to the residual speech. The residual speech may be run through a filter 820 using line spectral pairs 834, such as the LPC coefficient from an inverse transform 822, to add the formants to the speech. Raw synthesized speech may then be provided from the filter 820 to a post-filter 824. The post-filter 824 may be a digital filter in the audio band that may smooth the speech and reduce out-of-band components. Alternatively, and without limitation, the speech generator 832 may use NELP or PPP full-frame decoding methods.

Figure 9:
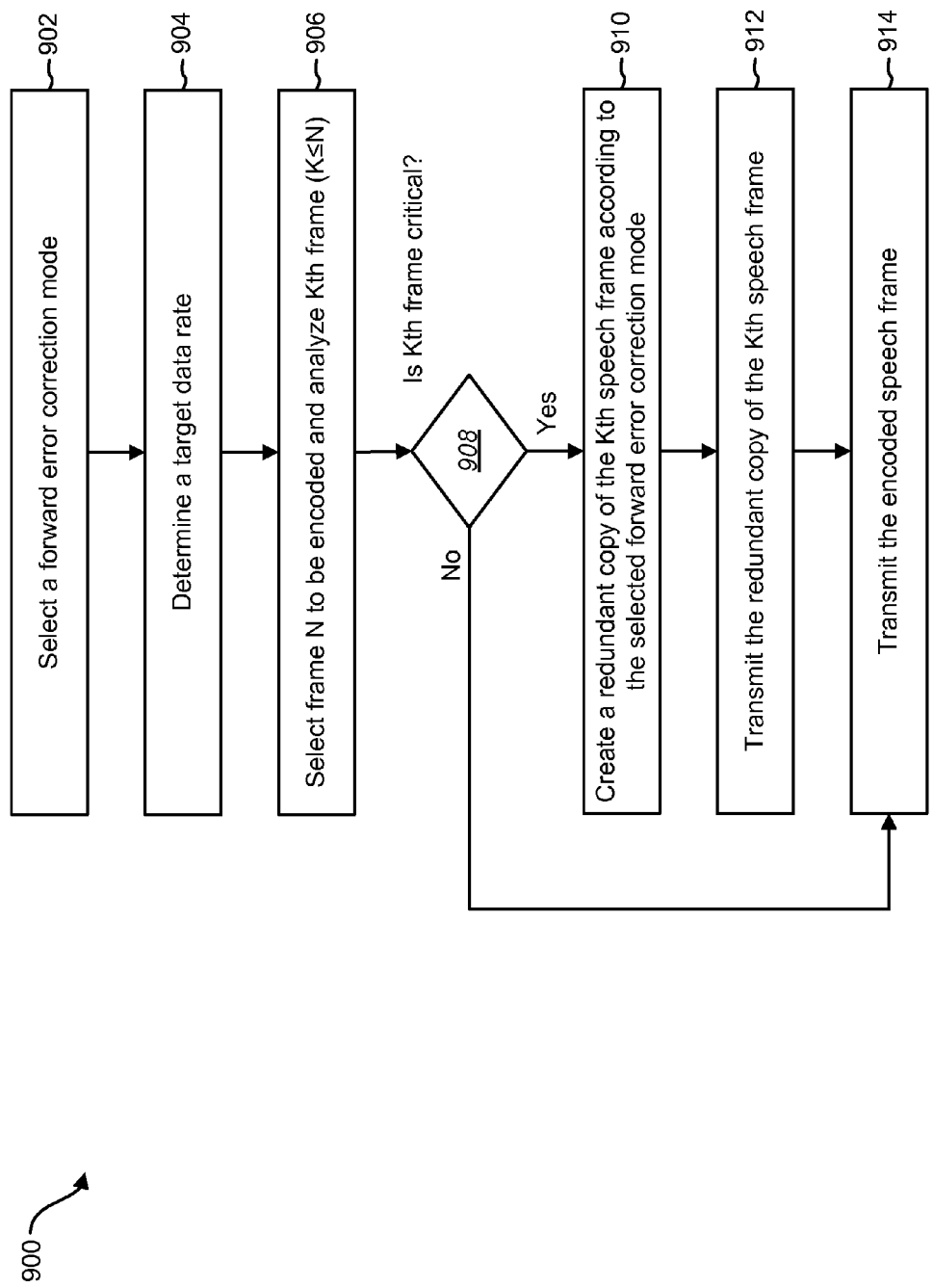
FIG. 9 is a flow diagram illustrating one example of a method of forward error correction (FEC) for Voice over Internet Protocol (VoIP)

FIG. 9 is a flow diagram illustrating one example of a method 900 of forward error correction (FEC) for VoIP. The method 900 may be implemented by the transmitting terminal 102. During the set-up of a VoIP call between the transmitting terminal 102 and the receiving terminal 104, an appropriate FEC mode (e.g., full protection mode or partial protection mode) may be selected 902. The mode may be selected based on the physical transmission channels and the support of the transmitting terminal 102 and the receiving terminal 104. A target data rate may also be determined. In one example, a target data rate is determined 904 according to the capacity demand. An FEC offset value may also be determined. In one example, the FEC offset value is predetermined. In another example, the FEC offset value can be adaptively adjusted based on the channel condition.

A speech frame to be encoded, frame N, may be selected 906. A Kth speech frame ($K \leq N$) may then be analyzed 906 and a determination 908 may be made as to whether or not the Kth speech frame is a critical frame. Choosing which frame to analyze 906 may depend on the FEC offset. For example, if the FEC offset is 2, the N−2 frame may be analyzed. In one configuration, during the VoIP call, for every encoded frame, the encoder 106 within the transmitting terminal 102 may decide whether the Kth speech frame should be protected (i.e., whether or not the Kth speech frame is a critical frame). The encoder 106 may also determine how the Kth speech frame is to be protected based on the target data rate, the result of the determination 908 and the selected FEC mode. In one configuration, the target data rate and the FEC offset value may be adjusted during run-time based on the channel state information 120 fed back from the receiving terminal 104.

If the Kth speech frame is not a critical frame, only the encoded speech frame N is transmitted 914 to the receiving terminal. If it is decided 908 that the Kth speech frame is a critical frame, a redundant copy of the Kth speech frame may be created 910. The creation of the redundant copy of the Kth speech frame may be based on the selected FEC mode. For example, the redundant copy may be created with some or all of the parameters included in the critical Kth speech frame depending on whether the selected FEC mode is the full protection mode or the partial protection mode. Alternatively, the redundant copy may be created using another coding method, which may have a lower-rate than the coding method for the primary copy.

In one configuration, the primary copy (i.e., the current speech frame N) and the redundant copy of the critical Kth speech frame may be packetized into real-time protocol (RTP) packets and transmitted 912, 914 to the receiving terminal 104. In another configuration, the primary copy of a frame and the redundant copy of the Kth speech frame, although generated at the same time, may be packed individually into two different RTP packets and transmitted to the receiving terminal. The decision of which format to use may be based on the capabilities of both terminals. If both formats are supported in each terminal, the format causing lower data rate is used. At the receiver side, the speech frames may be stored in the adaptive de-jitter buffer 802. As previously mentioned, the de-jitter buffer 802 may be designed so that the average delay for speech frames is no larger than the average delay without FEC techniques. The frames may be sent to the decoder 108 in the proper order from the de-jitter buffer 802. If the speech frame is a redundant copy with some of the parameters of the primary copy, the partial frame decoding module 850 is used.

The source and channel controlled FEC scheme described above may reduce the number of packet losses and the burstiness of the losses while only causing moderate increases in the data rate. Critical frame identification and the partial frame protection mode may ensure a good trade-off between speech perceptual quality and the data rate. The modification to the de-jitter buffer may not introduce additional end-to-end delay. The dynamic rate control module 312 may allow the FEC scheme described above to be carried out at any specified data rate so that operators may decide the data rate based on capacity demand. Finally, the FEC mode selection carried out by the FEC mode selection algorithm 308 may decide whether the partial frame protection mode is used based on the physical channel properties and the capabilities of the handsets (e.g., the transmitting terminal 102 and the receiving terminal 104.) The FEC scheme described above may not waste the available bandwidth and is backward compatible with legacy communication devices.

If a terminal with FEC functionality communicates with a legacy terminal (which can only decode full frames), the partial frame protection may be disabled, so that the legacy handset may benefit from the FEC redundancy. If a partial frame is sent to a legacy terminal, the legacy terminal may ignore the partial frame since may not understand the format of the partial frame, potentially causing the waste of available bandwidth.

Figure 10:
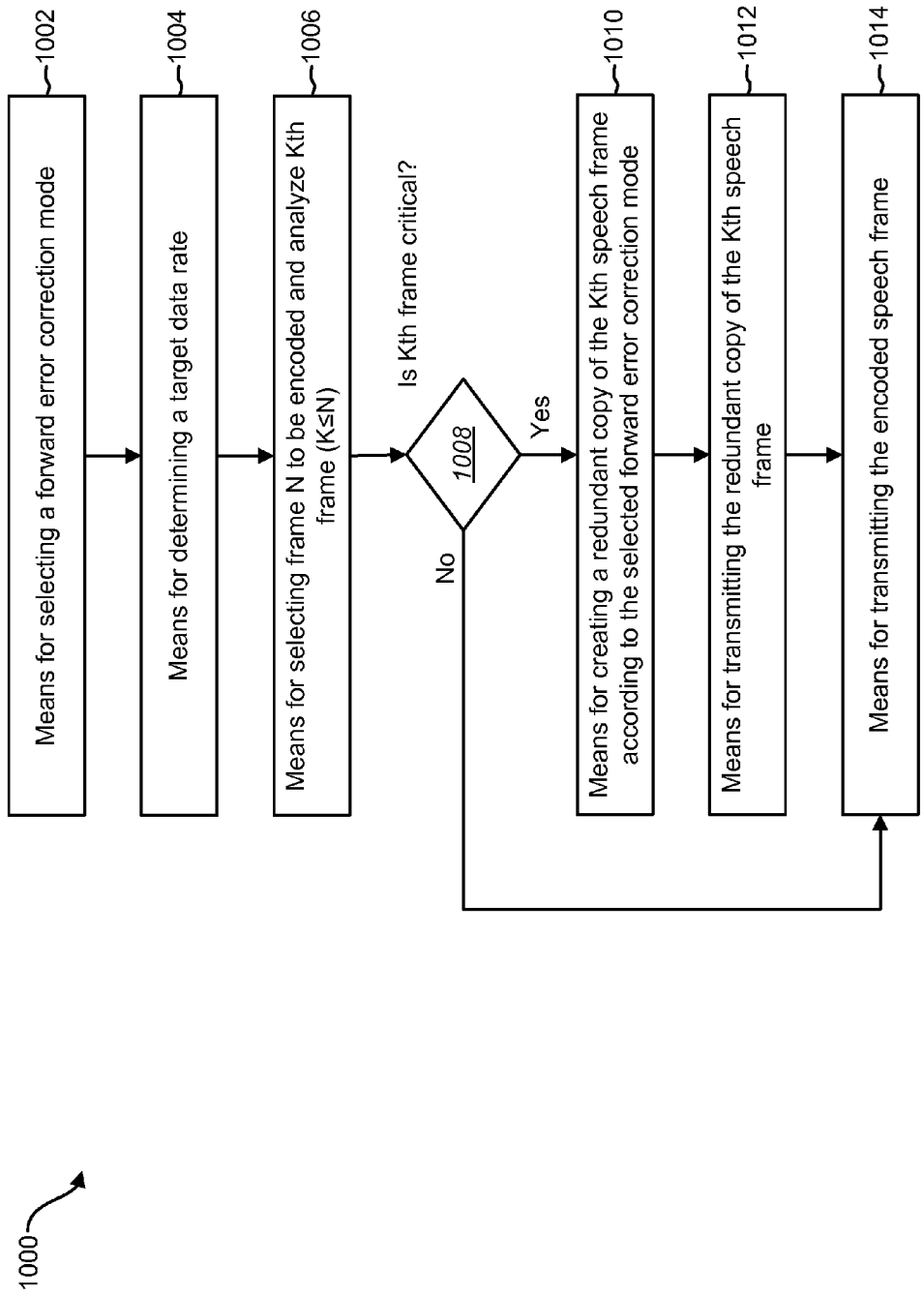
FIG. 10 illustrates means plus function blocks corresponding to the method shown in FIG. 9.

The method of FIG. 9 described above may be performed by various hardware and/or software component(s) and/or module(s) corresponding to the means-plus-function blocks illustrated in FIG. 10. In other words, blocks 902 through 914 illustrated in FIG. 9 correspond to means-plus-function blocks 1002 through 1014 illustrated in FIG. 10.

Figure 11:
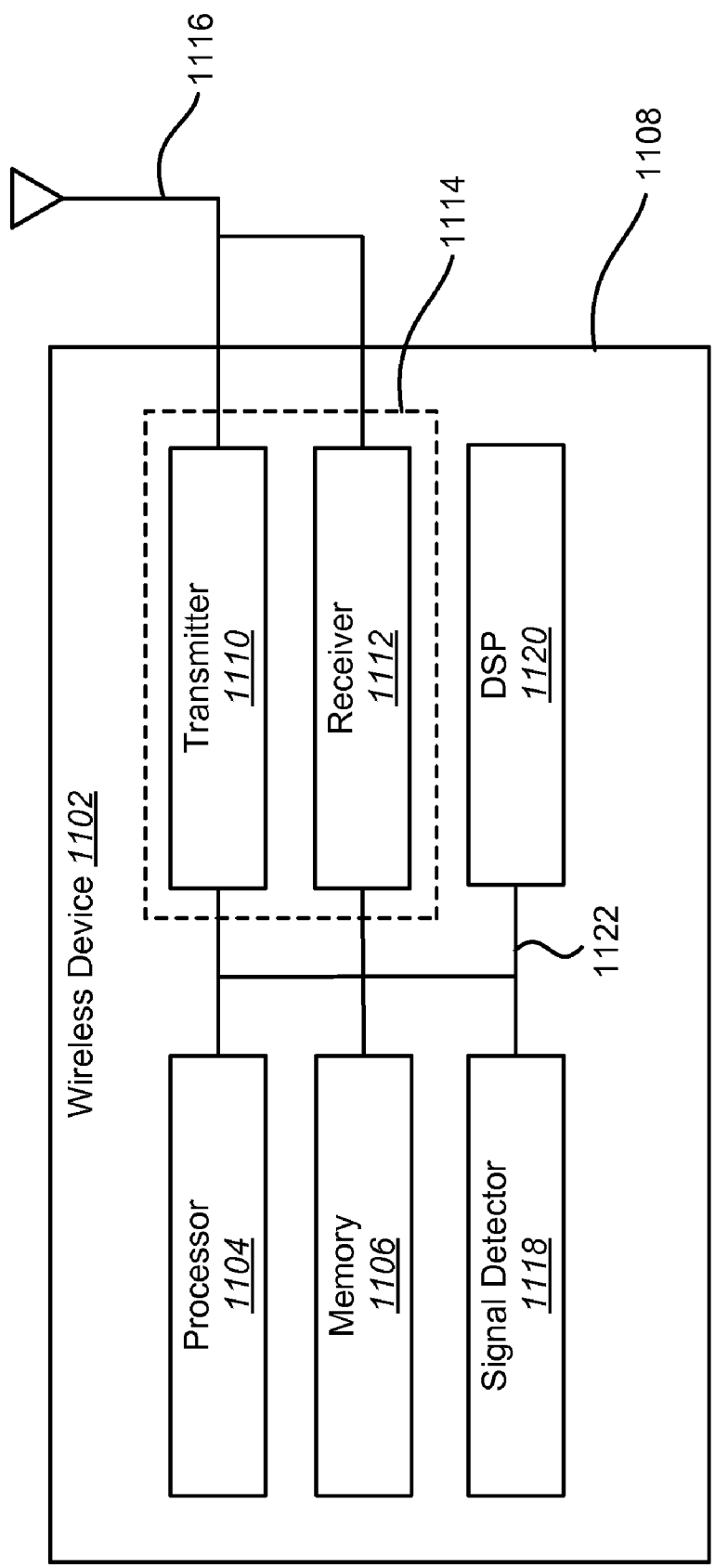
FIG. 11 illustrates various components that may be utilized in a wireless communication device.

FIG. 11 illustrates various components that may be utilized in a wireless device 1102. The wireless device 1102 is an example of a device that may be configured to implement the various methods described herein. The wireless device 1102 may be a remote station, access terminal, handset, personal digital assistant (PDA), cellular telephone, etc.

The wireless device 1102 may include a processor 1104 which controls operation of the wireless device 1102. The processor 1104 may also be referred to as a central processing unit (CPU). Memory 1106, which may include both read-only memory (ROM) and random access memory (RAM), provides instructions and data to the processor 1104. A portion of the memory 1106 may also include non-volatile random access memory (NVRAM). The processor 1104 typically performs logical and arithmetic operations based on program instructions stored within the memory 1106. The instructions in the memory 1106 may be executable to implement the methods described herein.

The wireless device 1102 may also include a housing 1108 that may include a transmitter 1110 and a receiver 1112 to allow transmission and reception of data between the wireless device 1102 and a remote location. The transmitter 1110 and receiver 1112 may be combined into a transceiver 1114. An antenna 1116 may be attached to the housing 1108 and electrically coupled to the transceiver 1114. The wireless device 1102 may also include (not shown) multiple transmitters, multiple receivers, multiple transceivers and/or multiple antenna.

The wireless device 1102 may also include a signal detector 1118 that may be used to detect and quantify the level of signals received by the transceiver 1114. The signal detector 1118 may detect such signals as total energy, pilot energy per pseudonoise (PN) chips, power spectral density, and other signals. The wireless device 1102 may also include a digital signal processor (DSP) 1120 for use in processing signals.

The various components of the wireless device 1102 may be coupled together by a bus system 1122 which may include a power bus, a control signal bus, and a status signal bus in addition to a data bus. However, for the sake of clarity, the various busses are illustrated in FIG. 11 as the bus system 1122.

Figure 12:
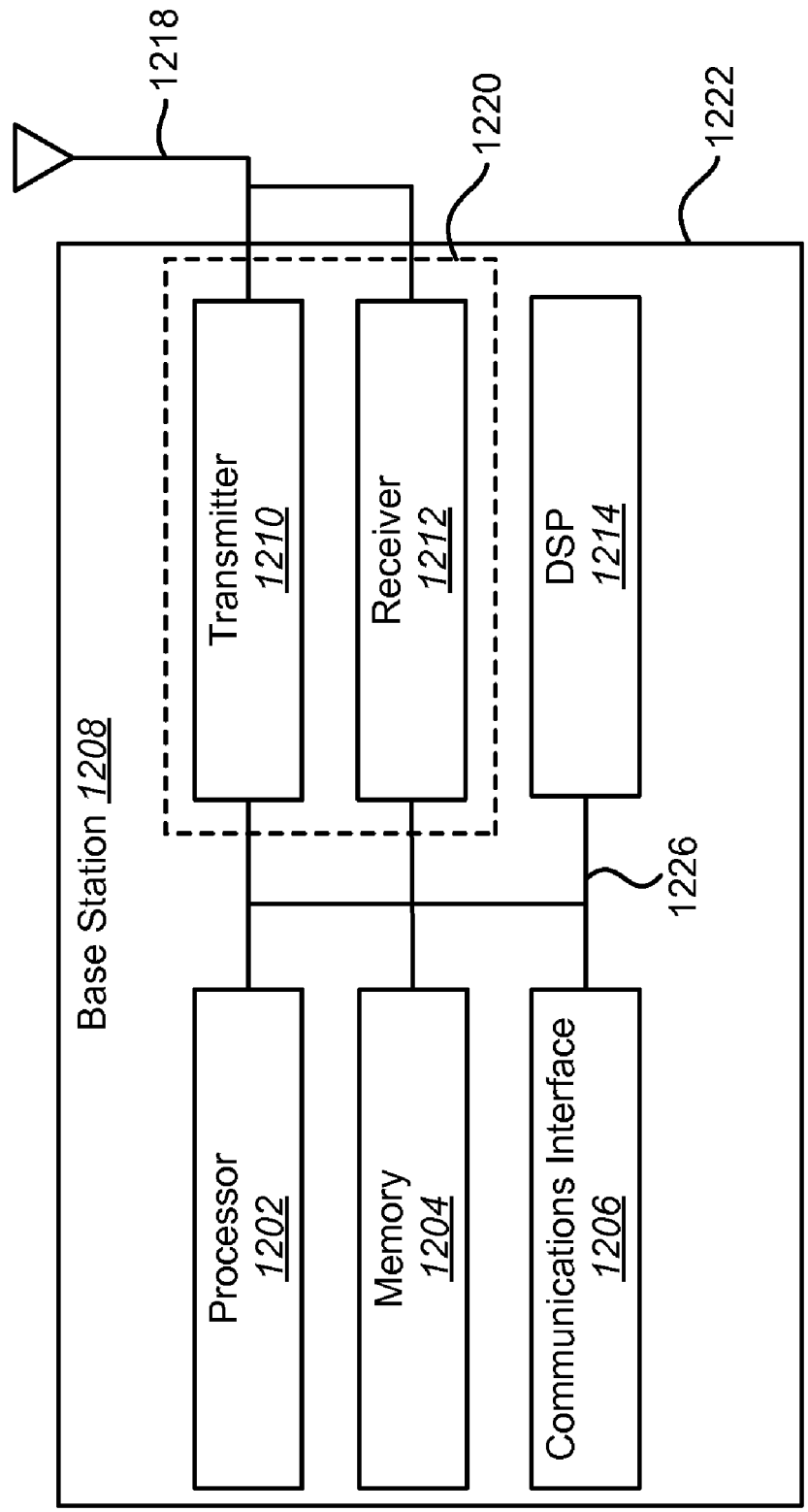
FIG. 12 is a block diagram of a base station in accordance with one example of the disclosed systems and methods.

FIG. 12 is a block diagram of a base station 1208 in accordance with one example of the disclosed systems and methods. Examples of different implementations of a base station 1208 include, but are not limited to, an evolved NodeB (eNB), a base station controller, a base station transceiver, an access router, etc. The base station 1208 includes a transceiver 1220 that includes a transmitter 1210 and a receiver 1212. The transceiver 1220 may be coupled to an antenna 1218. The base station 1208 further includes a digital signal processor (DSP) 1214, a general purpose processor 1202, memory 1204, and a communications interface 1206. The various components of the base station 1208 may be included within a housing 1222.

The processor 1202 may control operation of the base station 1208. The processor 1202 may also be referred to as a CPU. The memory 1204, which may include both read-only memory (ROM) and random access memory (RAM), provides instructions and data to the processor 1202. A portion of the memory 1204 may also include non-volatile random access memory (NVRAM). The memory 1204 may include any electronic component capable of storing electronic information, and may be embodied as ROM, RAM, magnetic disk storage media, optical storage media, flash memory, on-board memory included with the processor 1202, EPROM memory, EEPROM memory, registers, a hard disk, a removable disk, a CD-ROM, etc. The memory 1204 may store program instructions and other types of data. The program instructions may be executed by the processor 1202 to implement some or all of the methods disclosed herein.

In accordance with the disclosed systems and methods, the antenna 1218 may receive reverse link signals that have been transmitted from a nearby communications device 1102. The antenna 1218 provides these received signals to the transceiver 1220 which filters and amplifies the signals. The signals are provided from the transceiver 1220 to the DSP 1214 and to the general purpose processor 1202 for demodulation, decoding, further filtering, etc.

The various components of the base station 1208 are coupled together by a bus system 1226 which may include a power bus, a control signal bus, and a status signal bus in addition to a data bus. However, for the sake of clarity, the various busses are illustrated in FIG. 12 as the bus system 1226.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 9-10, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for preventing loss of information within a speech signal, the method being implemented by a wireless transmitting terminal, comprising:
   selecting a first speech frame to be encoded;
   determining if a second speech frame is a critical speech frame based on information within the second speech frame and one or more adjacent speech frames;
   creating at least a part of an encoded version of the second speech frame if the second speech frame is a critical speech frame; and
   transmitting the first speech frame and at least a part of the encoded version of the second speech frame.

2. The method of claim 1, further comprising:
   determining a target data rate; and
   selecting a forward error correction (FEC) mode according to the determined target data rate.

3. The method of claim 1, wherein the at least a part of the encoded version of the second speech frame is identical to the second speech frame.

4. The method of claim 2, wherein the forward error correction (FEC) mode comprises a full protection mode.

5. The method of claim 2, wherein the forward error correction (FEC) mode comprises one of a plurality of partial protection modes.

6. The method of claim 1, wherein the at least a part of the encoded version of the second speech frame includes a subset of the information within the second speech frame.

7. The method of claim 6, wherein the at least a part of the encoded version of the second speech frame is constructed using a lower bit-rate encoding type than was used to encode the second speech frame.

8. The method of claim 1, further comprising determining an offset value that indicates when the at least a part of the encoded version of the second speech frame is transmitted.

9. The method of claim 1, wherein determining if the second speech frame is a critical frame further comprises analyzing properties of the second speech frame and one or more adjacent speech frames.

10. The method of claim 1, wherein determining if the second speech frame is a critical speech frame is further based on a speech mode used to encode the second speech frame.

11. The method of claim 10, wherein the speech mode of the speech frames is voiced, unvoiced, transient, steady-voiced, or voiced onset.

12. The method of claim 1, wherein determining if the second speech frame is a critical speech frame is further based on a speech coding type used to encode the second speech frame.

13. The method of claim 12, wherein the speech coding type comprises code excited linear prediction (CELP), noise excited linear prediction (NELP), or prototype pitch period (PPP).

14. The method of claim 5, further comprising disabling the partial protection mode if a full protection mode is selected.

15. The method of claim 2, further comprising adjusting the target data rate based on channel state information of a channel used to transmit the first speech frame and the at least a part of the encoded version of the second speech frame.

16. The method of claim 1, wherein there is an offset measured between a transmit time of the second speech frame and a transmit time of the least a part of the encoded version of the second speech frame.

17. The method of claim 16, wherein the offset is estimated using channel state information of a channel used to transmit speech frames and wherein the offset can be dynamically adjusted.

18. The method of claim 2, wherein the determining a target data rate is based on capacity demand.

19. The method of claim 2, wherein the determining a target data rate is based on feedback of channel state information.

20. The method of claim 2, wherein the selecting a forward error correction (FEC) mode comprises:
determining a criticalness level of the second speech frame;
determining a first operating data rate that is higher than the target data rate;
determining a second operating data rate that is lower than the target data rate; and
selecting a FEC mode to meet the target data rate.

21. The method of claim 2, wherein the forward error correction (FEC) mode is selected randomly such that average of data rates of speech frames implementing the mode approaches the target data rate.

22. The method of claim 2, wherein the forward error correction (FEC) mode is selected such that the data rate of the speech frame implementing the mode approaches the target data rate.

23. The method of claim 1, wherein determining if the second speech frame is critical comprises calculating a difference between the second speech frame and one or more adjacent speech frames, wherein the second speech frame is critical if the difference is larger than a predetermined threshold.

24. The method of claim 10, wherein determining if the second speech frame is critical is based on the speech mode of the second frame.

25. The method of claim 1, wherein criticalness of a critical speech frame is determined based on parameters, characteristics, coding types and modes of a critical second speech frame and adjacent speech frames.

26. The method of claim 1, further comprising packing the first speech frame and the at least a part of the encoded version of the second speech frame into one or more real time protocol (RTP) packets.

27. The method of claim 26, wherein a format of the one or more RTP packets is based on the capabilities of a transmitting terminal and a receiving terminal.

28. The method of claim 5, wherein the selecting of a partial protection mode is based on bandwidth availability, the target data rate, and characteristics of the first speech frame, the second speech frame, and adjacent speech frames.

29. A wireless device for preventing loss of information within a speech signal, comprising:
a critical frame identification module configured to use information within a second speech frame and one or more adjacent speech frames to determine if the second speech frame is a critical speech frame;
a forward error correction (FEC) module configured to create at least a part of an encoded version of the second speech frame according to a selected forward error correction mode if the second speech frame is a critical speech frame; and
a transmitter configured to transmit a first speech frame and the at least a part of the encoded version of the second speech frame.

30. The wireless device of claim 29, further comprising:
a target data rate; and
a rate control module configured to select the forward error correction mode according to the target data rate.

31. The wireless device of claim 30, wherein the forward error correction (FEC) module is configured to create the at least a part of the encoded version of the second speech frame according to the selected forward error correction mode.

32. The wireless device of claim 30, wherein the forward error correction (FEC) mode comprises a full protection mode.

33. The wireless device of claim 29, wherein the at least a part of the encoded version of the second speech frame is identical to the second speech frame.

34. The wireless device of claim 30, wherein the forward error correction (FEC) mode comprises one of a plurality of partial protection modes.

35. The wireless device of claim 29, wherein the at least a part of the encoded version of the second speech frame includes a subset of the information within the second speech frame.

36. The wireless device of claim 29, wherein the at least a part of the encoded version of the second speech frame is constructed using a lower bit-rate encoding type than was used for the second speech frame.

37. The wireless device of claim 29, wherein the wireless device is a handset.

38. The wireless device of claim 29, wherein the wireless device is a base station.

39. The wireless device of claim 29, wherein there is an offset measured between a transmit time of the second speech frame and a transmit time of the least a part of the encoded version of the second speech frame.

40. The wireless device of claim 39, wherein the offset is estimated using channel state information of a channel used to transmit speech frames and wherein the offset can be dynamically adjusted.

41. The wireless device of claim 30, wherein the target data rate is determined based on capacity demand.

42. The wireless device of claim 30, wherein the target data rate is determined based on feedback of channel state information.

43. The wireless device of claim 30, wherein the rate control module is further configured to:
   determine a criticalness level of the second speech frame;
   determine a first operating data rate that is higher than the target data rate;
   determine a second operating data rate that is lower than the target data rate; and
   select a forward error correction (FEC) mode to meet the target data rate.

44. The wireless device of claim 30, wherein the forward error correction (FEC) mode is selected randomly such that average of data rates of speech frames implementing the mode approaches the target data rate.

45. The wireless device of claim 30, wherein the forward error correction (FEC) mode is selected such that the data rate of the speech frame implementing the mode approaches the target data rate.

46. The wireless device of claim 29, wherein determining if the second speech frame is critical comprises calculating a difference between the second speech frame and one or more adjacent speech frames, wherein the second speech frame is critical if the difference is larger than a predetermined threshold.

47. The wireless device of claim 29, wherein determining if the second speech frame is critical is based on a speech mode of the second speech frame.

48. The wireless device of claim 47, wherein the speech mode of the speech frames is voiced, unvoiced, transient, steady-voiced, or voiced onset.

49. The wireless device of claim 29, wherein criticalness of a critical second speech frame is determined based on parameters, characteristics, coding types and modes of the critical second speech frame and adjacent speech frames.

50. The wireless device of claim 29, wherein the first speech frame and the at least a part of the encoded version of the second speech frame are packed into one or more real time protocol (RTP) packets.

51. The wireless device of claim 50, wherein a format of one or more RTP packets is based on capabilities of a transmitting terminal and a receiving terminal.

52. The wireless device of claim 34, wherein the selecting of a partial protection mode is based on bandwidth availability, the target data rate, and characteristics of the first speech frame, the second speech frame, and adjacent speech frames.

53. The wireless device of claim 29, further comprising a de-jitter buffer modified to process a speech frame and a copy of some or all of the speech frame differently.

54. An apparatus for preventing loss of information within a speech signal, comprising:
   means for selecting a first speech frame to be encoded;
   means for determining if a second speech frame is a critical speech frame based on information within the second speech frame and one or more adjacent speech frames;
   means for creating at least a part of an encoded version of the second speech frame according to a selected forward error correction (FEC) mode if the second speech frame is a critical speech frame; and
   means for transmitting the first speech frame and the at least a part of the encoded version of the second speech frame.

55. A computer-program product for preventing loss of information within a speech signal, the computer-program product comprising a non-transitory computer readable medium having instructions thereon, the instructions comprising:
   code for selecting a first speech frame to be encoded;
   code for determining if a second speech frame is a critical speech frame based on information within the second speech frame and one or more adjacent speech frames;
   code for creating at least a part of an encoded version of the second speech frame according to a selected forward error correction (FEC) mode if the second speech frame is a critical speech frame; and
   code for transmitting the first speech frame and the at least a part of the encoded version of the second speech frame.

* * * * *